United States Patent [19]
Hardin

[11] 3,809,995
[45] May 7, 1974

[54] MULTIPLE OUTPUT ALTERNATOR
[75] Inventor: James T. Hardin, Lambertville, Mich.
[73] Assignee: Eltra Corporation, Toledo, Ohio
[22] Filed: Dec. 11, 1972
[21] Appl. No.: 314,184

Related U.S. Application Data
[62] Division of Ser. No. 90,899, Nov. 19, 1970.

[52] U.S. Cl............... 321/5, 307/16, 307/18, 320/57, 320/17, 322/28, 322/90
[51] Int. Cl. ............................................ H02m 7/00
[58] Field of Search........ 320/57, 59, 64, 17; 321/5; 322/28, 90; 307/16, 18

[56] References Cited
UNITED STATES PATENTS

| | | | |
|---|---|---|---|
| 2,838,726 | 6/1958 | Boyer | 320/59 |
| 3,063,002 | 11/1962 | Phelon | 322/90 |
| 3,176,212 | 3/1965 | DePuy | 321/8 |
| 3,160,772 | 12/1964 | Miron | 322/90 |
| 3,267,353 | 8/1966 | Franklin | 322/90 |
| 3,379,957 | 4/1968 | Gugliemi | 322/59 X |
| 3,710,226 | 1/1973 | Seike | 322/28 |

*Primary Examiner*—William M. Shoop, Jr.
*Attorney, Agent, or Firm*—Robert H. Johnson; Oliver E. Todd, Jr.

[57] ABSTRACT

A multiple output alternator having separate sets of power coils mounted on the stator adapted to be magnetically excited by a rotor having a direct current field coil is provided for a vehicle. The separate power coils being in a cooperative relation to give a distributed load condition when the rotor is driven by the variable speed power unit of the vehicle. Rectifying and voltage regulating means are provided for both sets of power coils to provide a high and low wattage power source, with the field coil of the rotor being supplied with a regulated D.C. voltage from the high wattage power source which also supplies power to the conventional electrical system of the automotive vehicle. For example, two power sources from an alternator are adapted to be used for charging batteries in a power system having two storage batteries which supply power to circuits requiring differing voltages, a relatively low voltage circuit which may include the high wattage power source and one of the batteries and a relatively high voltage circuit which is supplied by both storage batteries in series connection for special purposes such as starting of the variable speed power unit. More than two outputs could be supplied if desired.

10 Claims, 6 Drawing Figures

INVENTOR.
JAMES T. HARDIN
BY
ATTORNEY

INVENTOR.
JAMES T. HARDIN
BY
D Henry Stoltenberg
ATTORNEY

INVENTOR.
JAMES T. HARDIN
BY
ATTORNEY

MULTIPLE OUTPUT ALTERNATOR

This is a division, of application, Ser. No. 90,899 filed Nov. 19, 1970.

The problem of starting large engines of trucks under cold ambient conditions has been burdensome and has usually been solved by the use of a supplemental battery or batteries which are connected in series to provide a higher voltage to a suitable starting motor. A presently employed system of connecting supplemental batteries in series to obtain higher voltages for starting is built around a series-parallel switch which in conjunction with considerable interconnecting wiring connects the batteries in series during the engine cranking cycle and is parallel during the charging cycle.

The present invention contemplates the provision of an alternator having at least two separate power coils on its stator. A principal power coil is provided which will energize the main power consuming circuits of a vehicle, such as ignition, lighting, etc. including charging of the main storage battery, and a secondary power coil which will charge a secondary storage battery used only in series connection with the main storage battery for starting purposes or other power consuming circuit which requires a higher voltage for efficient utilization.

The present invention further contemplates the provision of an alternator having at least two separate power providing circuits which are each provided with voltage regulating devices to maintain the voltage generated in the circuits within predetermined limits over a range of operating conditions, and which also provides a cooperative relation between the circuits whereby the total power may be divided between the circuits under certain prescribed conditions.

It is therefore a principal object of this invention to provide an alternator for use with vehicles having a variable speed power source which has two power-providing circuits for supplying voltage regulated power to various power consuming devices on the vehicle operable at different voltages.

It is a further object of the invention to provide an alternator having two power-providing circuits for supplying voltage regulated power at different voltages to power consuming device which has a cooperative relation between the circuits which allows power to be delivered from one circuit to the other under predetermined conditions.

Other objects and advantages of this invention relating to the arrangement, operation and function of the related elements of the structure, to various details of construction, to combinations of parts and to economies of manufacture will be apparent to those skilled in the art upon consideration of the following description and appended claims, reference being had to the accompanying drawings forming a part of this specification wherein like reference characters designate corresponding parts in the several views.

Figure 1:
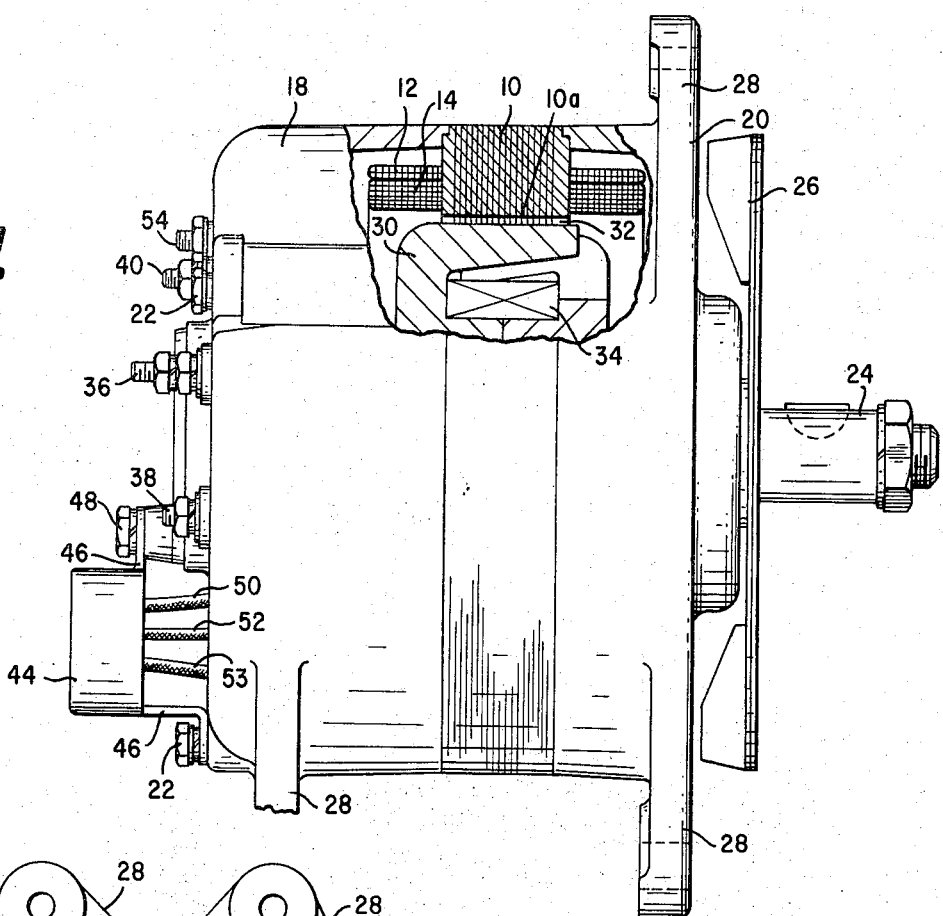
FIG. 1 is an elevational view partly in cross section showing an alternator incorporating the invention.
Figure 2:
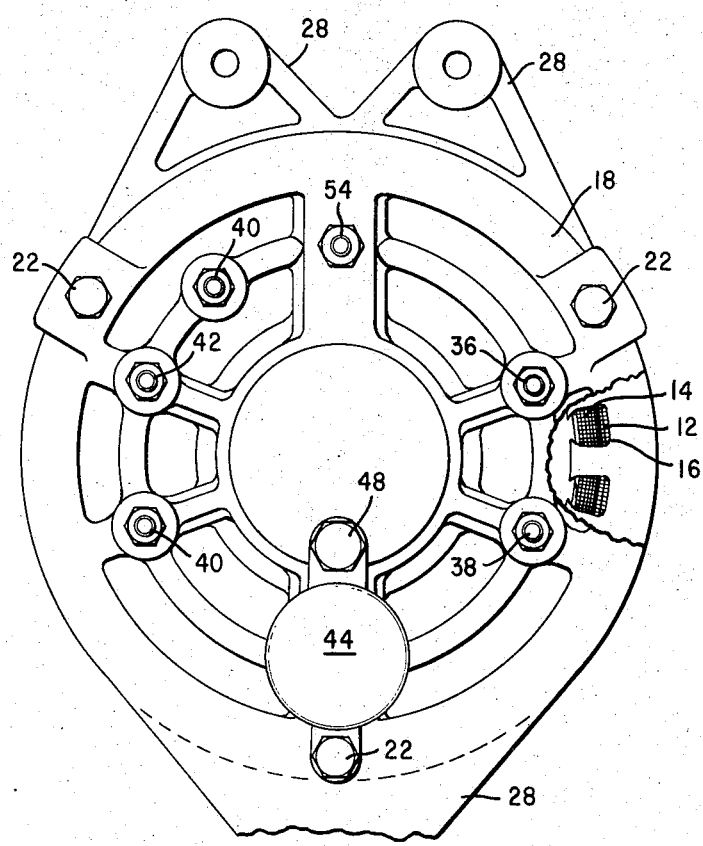
FIG. 2 is an elevational end view of the alternator, partly in section taken from the left end of FIG. 1.

Referring to the drawings, particularly to FIGS. 1 and 2, an alternator is shown having a laminated stator element 10 in which power-producing coils 12 and 14 are mounted in its slots 16 in a conventional manner. It is to be understood that the power coils 12 and 14 may be connected together in various ways as will appear hereinafter, so that a single portion of a power coil may be mounted in a single slot or portions of two or even more coils may be so mounted, depending upon their function in the power circuits.

The stator element 10 is clamped between end heads 18 and 20 by conventional through-bolts 22, the heads being provided with conventional bearings in which is journalled drive shaft 24 protruding from one side of the alternator as shown in FIG. 1, where a conventional drive pully or other driving member (not shown) may be attached, exteriorly of a cooling fan 26. The end heads 18 and 20 are provided with any suitable mounting lugs 28 whereby the alternator can be mounted in conventional manner on a vehicle in a driven relation with its variable speed engine.

The drive shaft 24 extends through the casing formed by the end heads in concentric relation with the stator element 10, and is provided with a Lundell type rotor 30 rotable within the central aperture 10a of the stator being separated by a small air gap 32. The rotor 30 is provided with a field coil 34 which is capable of being energized by a slip ring and brush arrangement (not shown) in the conventional manner. This provides magnetic excitation for the power coils 12 and 14 on the stator 10 when the rotor 30 is driven by the variable speed engine of the vehicle.

End head 18 is provided with an output terminal 36 and a field terminal 38 which is in circuit with the field coil 34 mounted on the rotor 30 in the manner already described. Regulating means (not shown) of a conventional solid state semi-conductor type may be mounted inside the alternator casing by bolts 40 cooperating with conventional heat sinks. The regulating means as is well known controls the direct current to the field coil 34 in such a manner that the voltage appearing at the output terminal 36 is maintained within predetermined limits. A second output terminal 42 is also provided connected to the second power coil as will be described hereinafter. This output voltage is also regulated by a solid state type static regulator mounted in encapsulated state in an external casing 44 mounted by lugs 46 on the outside of the end head 18 by bolt 48 and through bolt 22. Conductors 50, 52 and 53 extend from the casing 44 to the interior of the alternator to connect the regulator mounted therein to the alternator elements as will appear hereinafter. Terminal bolt 54 provides a negative ground for the alternator.

Figure 3:
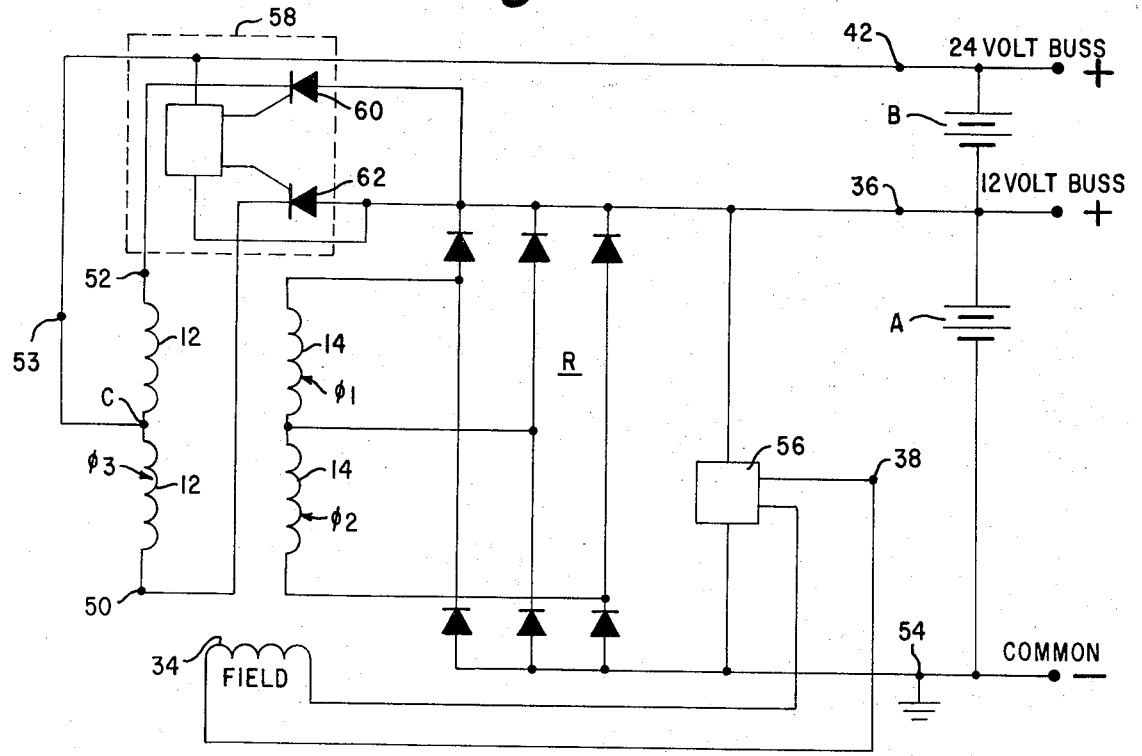
FIG. 3 is a schematic diagram of connections of the preferred form of the invention.

Referring to FIG. 3, which discloses a schematic diagram of connections of a preferred modification of an alternator incorporating the invention, a pair of 12 volt batteries are shown of which battery A is the main battery and battery B is the auxiliary battery. The batteries A and B are connected in series at all times, with the negative of battery A being grounded as at 54 or other point on the common lead. The positive of battery A is connected to a 12 volt buss and to the negative of battery B whose positive is connected to a 24 volt buss. The 12 volt buss supplies power to the main electrical system of the automotive vehicle including ignition, lighting, radio, heater, etc., while the 24 volt buss supplies power to the starter motor of the automotive vehicle or other intermittent 24 volt loads. Various switches, circuit breakers, fuses, and so forth that might be required on a particular vehicle have not been shown.

A representative alternator shown in FIG. 3 is a three phase type, wherein coils 14 are connected as a two phase winding, while the third phase has a central tap, C, maintained on the stator as a separate winding. Phase 1 and phase 2 ($\phi_1$ and $\phi_2$) are connected to a full wave rectifier R consisting of six silicon rectifiers, the outputs of which are connected from negative ground to positive 12 volt buss, (terminals 54 and 36 respectively) to supply the charging power for battery A and the main electrical system of the vehicle. The field winding 34 which magnetically excites all three phases is connected to the output of the rectifier R in a cooperative relation with the voltage regulator 56 via field terminal 38, whereby a controlled direct current is supplied to the field coil 34 to maintain the voltage of the output of phases 1 and 2 within predetermined limits.

Phase 3, ($\phi_3$), is connected across terminals 36 and 42 directly across battery B, and consists of coil 12 with a center tap C, cooperating with a second static regulator 58, including a pair of silicon controlled rectifiers 60 and 62, serving both a voltage control function of the series type and a rectifying function. In this manner full wave rectification of the output of the third phase is obtained with the desired voltage control in a cooperative relation to the regulation obtained by regulator 56 controlling field 34. A regulated voltage across terminals 36 and 42 is therefore available to charge battery B while at the same time an automatic regulation of the load division is obtained between the main phases 1 and 2 and the phase 3, which is auxiliary to the main phases.

With these parameters for the alternators, the normal electrical power requirements from phases 1 and 2 for a vehicle may be supplied with a total output of 80 amperes at the charging voltage of battery A. If the state of charge of battery B is low, as much as 20 amperes may be generated in phase 3 at the voltage required to charge the battery, which will be subtracted from the output of phases 1 and 2, so that about 60 amperes will be generated in these phases. This is due to the limited amount of magnetizing force generated by the field coil 34 which will be utilized for the magnetic excitation of all three phases. If phase 3 is not utilizing sufficient magnetizing force to generate its maximum output of 20 amperes, that remaining will automatically be available to generate output in phases 1 and 2 if required so as to increase their available power outputs. In this way, an automatic regulation of the division of power between main phases 1 and 2 and the auxiliary phase 3 is attained.

Figure 4:
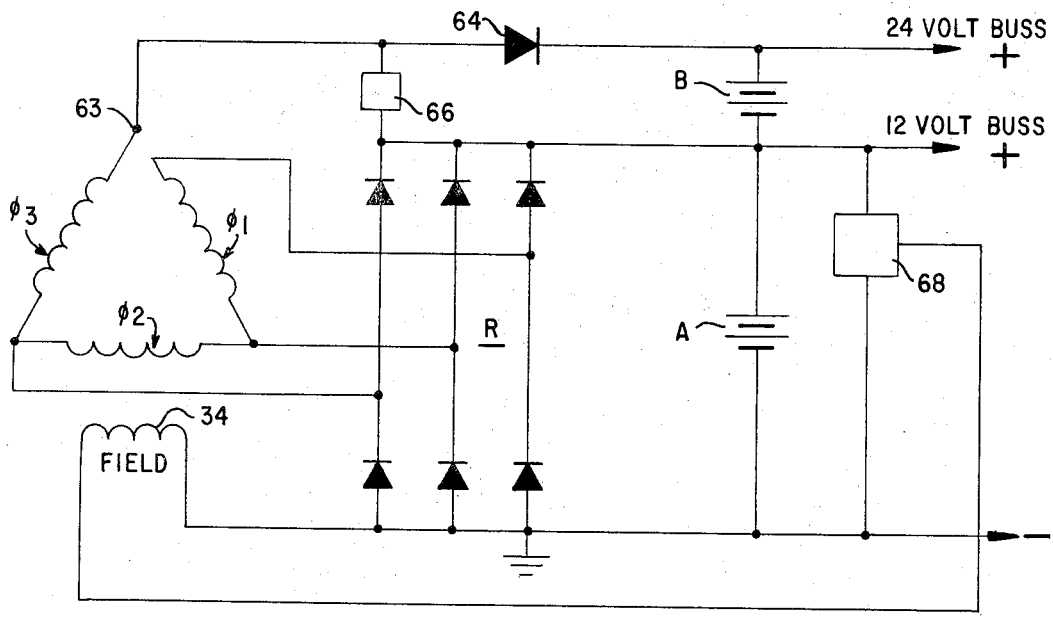
FIGS. 4, 5 and 6 are schematic diagrams of connection of a modification of the invention.

In the modification shown in FIG. 4, the three phases are shown connected in an open delta, with phases 1 and 2 being connected to a full wave rectifier R whose output is the main 12 volt source of power. Regulator 68 may be made separate of the alternator, but responsive to the output voltage of the rectifier R to control direct current to the field coil 34 to regulate the voltage of phases 1 and 2. Phase 3 is in circuit with the open end 63 of phase 3 being provided with half wave rectification by diode 64. The output of phase 3 is controlled by voltage regulator 66 of the shunt type connected across phase 3, short circuiting phase 3 when the voltage exceeds a predetermined value and thereby limiting the charging voltage delivered to battery B.

Figure 5:
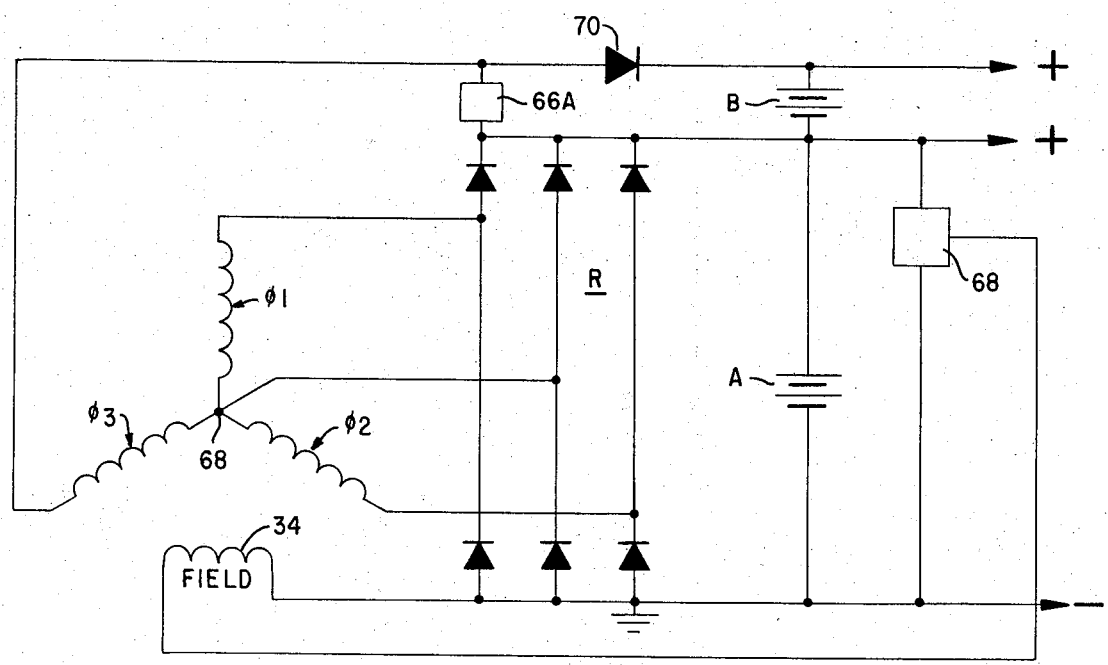

The alternator shown in FIG. 5 is similar to that shown in FIG. 4, except that the 3 phases are connected in "Y" having a common central connection 68. Half wave regulation is provided by the diode 70 and voltage regulation by regulator 66A.

Figure 6:
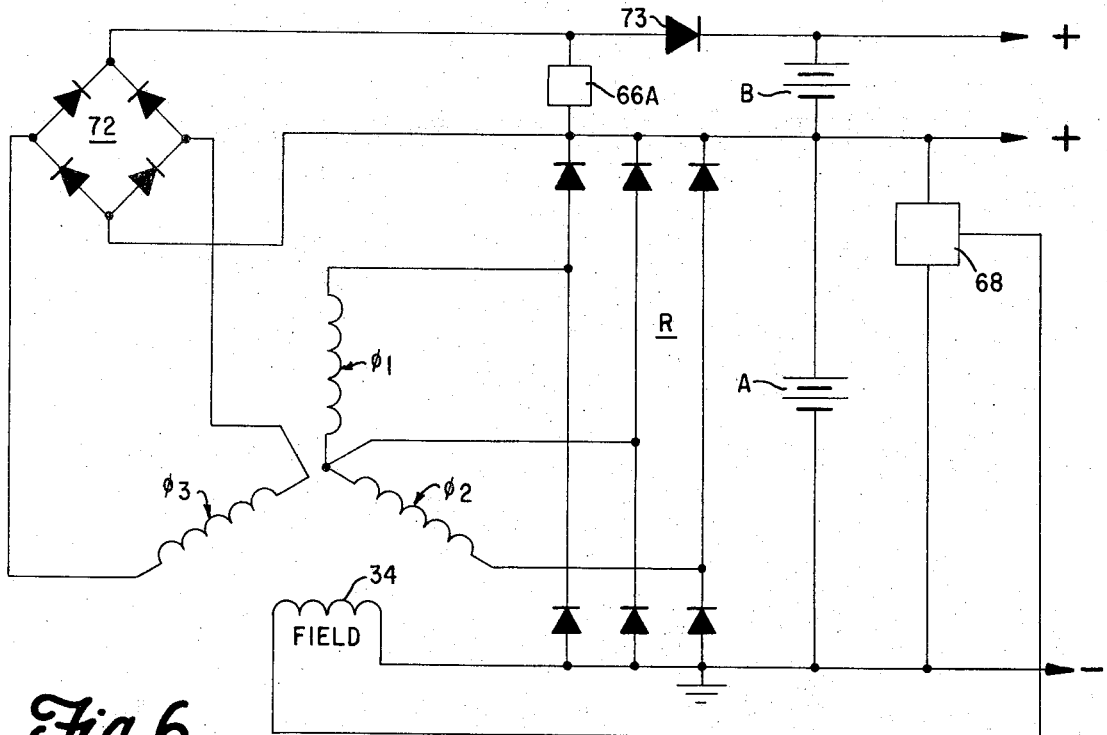

The alternator shown in FIG. 6 is similar to that shown in FIG. 5, except that the phases 1 and 2 are separated from phase 3 and phase 3 is also provided with full wave rectification by rectifier 72. The circuit operation is the same except the shunt voltage regulator 66A is shown operating on the D.C. side of the auxiliary circuit rectifiers 72.

It is to be understood that the above detailed description of the present invention is intended to disclose an embodiment thereof to those skilled in the art, but that the invention is not to be construed as limited in its application to the details of construction and arrangement of parts illustrated in the accompanying drawing since the invention is capable of being practiced and carried out in various ways without departing from the spirit of the invention. The language used in the specification relating to the operation and function of the elements of the invention is employed for purposes of description and not of limitation, and it is not intended to limit the scope of the following claims beyond the requirements of the prior art.

I claim:

1. In a power supply and/or charging system for a vehicle, a variable speed power unit, an alternator having a multiplicity of power coils on its stator excited by a rotatable field member driven by the power unit, regulators to control the voltages of the outputs of said power coils, rectifiers for the outputs of said power coils to rectify the alternating currents generated by the power coils, with at least a first storage battery connected to receive the rectified output of the first of said power coils, a second storage battery connected to receive the rectified power output of the second of said power coils, a relatively low voltage power-consuming means, conductors for connecting said low voltage power-consuming means to the first storage battery, a relative high voltage power-consuming means, and conductors for connecting the high power-consuming means to both first and second batteries connected in series.

2. The device defined in claim 1, further characterized by a cooperative relation between the power coils whereby a division of the loads energized by the coil may be automatically divided in accordance with demand.

3. The device defined in claim 1, further characterized by silicon controlled rectifiers in the regulator for the second of said power coils, which has a dual function of control and rectification.

4. The device defined in claim 1, further characterized by the high voltage power-consuming means being a starter motor for the engine of the vehicle.

5. An alternator assembly for delivering power to two series connected loads in a vehicle having a variable speed power unit comprising, in combination, a stator, a rotor adapted to magnetically excite said stator, a field coil on said rotor for direct current excitation, at least two separate power coils on said stator to generate separate alternating currents when excited by said rotor, means for regulating the voltages generated by each of said power coils, means for rectifying the regulated alternating currents generated by said power coils, means for exciting said field coil with the recitfied output of one of said power coils, means for connecting one of the rectified outputs to one load, and means for connecting the other rectified output to the other load.

6. The alternator assembly defined in claim 5, further characterized by a cooperative relation between said power coils and said rotor for exciting said power coils in accordance with demand by said loads.

7. An alternator assembly having multiple outputs for supplying power to at least two series connected loads and adapted to be driven by a variable speed power unit of a vehicle comprising, in combination, a stator adapted to mount power coils, a rotor adapted to be driven by the power unit to magnetically excite said stator, said rotor including a direct current field coil, a first group of power coils on said stator to generate a first alternating current voltage, a second group of power coils on said stator to generate a second alternating current voltage, said second group of power coils being symmetrically positioned relative to said first group of power coils to distribute the alternator power output, first regulating means for said first group of power coils to control the output voltage generated by said first group of coils, said first regulating means controlling the total power output of the alternator by controlling the average voltage supplied to the field coil of said rotor, means for rectifying the outputs of the first and the second groups of power coils, second regulating means for the second group of power coils to control the maximum voltage generated by said second group of coils, means for connecting the first rectified coil output to a first of the loads, means for connecting the second rectified coil output to a second of the loads, and means for mounting said rectifying means and said first and second regulating means on the alternator.

8. The alternator assembly defined in claim 7, further characterized by a cooperative relation between said power coils and said rotor for exciting said power coils in accordance with demand by said loads.

9. The alternator assembly defined in claim 7, further characterized by silicon controlled rectifiers in said second regulating means for second of said power coils, which has a dual function of control and rectification.

10. For a vehicle having a variable speed power unit and in which at least two series connected batteries supply power to a first load and one of the batteries also supplies power to a second load, an alternator system for charging the batteries while they are connected in series comprising, in combination, an alternator having a multiplicity of power coils on a stator for supplying at least two alternating current outputs when excited by a rotatable field member driven by the power unit, means for regulating the voltages generated by each of said power coils, means for rectifying the two regulated outputs, means for charging one of the batteries with one of the rectified outputs, and means for charging the other of the batteries with the other rectified output, said power coils selectively dividing power to the rectified outputs for charging the batteries in response to power demand by such batteries and the first and second loads connected to such batteries.

* * * * *